US012183946B2

(12) United States Patent
Takahashi et al.

(10) Patent No.: US 12,183,946 B2
(45) Date of Patent: Dec. 31, 2024

(54) SEPARATOR FOR POWER STORAGE DEVICE

(71) Applicant: Asahi Kasei Kabushiki Kaisha, Tokyo (JP)

(72) Inventors: Masaki Takahashi, Tokyo (JP); Tomoya Tagawa, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 608 days.

(21) Appl. No.: 17/442,202

(22) PCT Filed: Mar. 17, 2020

(86) PCT No.: PCT/JP2020/011849
§ 371 (c)(1),
(2) Date: Sep. 23, 2021

(87) PCT Pub. No.: WO2020/196120
PCT Pub. Date: Oct. 1, 2020

(65) Prior Publication Data
US 2022/0181744 A1    Jun. 9, 2022

(30) Foreign Application Priority Data

Mar. 27, 2019 (JP) ................................ 2019-060924

(51) Int. Cl.
| | | |
|---|---|---|
| *H01M 50/417* | (2021.01) | |
| *H01M 50/409* | (2021.01) | |
| *H01M 50/449* | (2021.01) | |
| *H01M 50/489* | (2021.01) | |
| *H01M 50/491* | (2021.01) | |

(52) U.S. Cl.
CPC ....... *H01M 50/417* (2021.01); *H01M 50/409* (2021.01); *H01M 50/449* (2021.01); *H01M 50/489* (2021.01); *H01M 50/491* (2021.01)

(58) Field of Classification Search
None
See application file for complete search history.

(56) References Cited

U.S. PATENT DOCUMENTS

| | | |
|---|---|---|
| 5,691,047 A | 11/1997 | Kurauchi et al. |
| 2007/0178324 A1 | 8/2007 | Masuda et al. |
| 2010/0099838 A1 | 4/2010 | Takeda et al. |
| 2011/0269900 A1 | 11/2011 | Tamura et al. |
| 2011/0294016 A1 | 12/2011 | Tamura et al. |
| 2012/0015229 A1 | 1/2012 | Ohashi et al. |
| 2013/0316246 A1 | 11/2013 | Fujimoto et al. |
| 2013/0316247 A1 | 11/2013 | Kuma et al. |
| 2016/0079580 A1 | 3/2016 | Sawada |
| 2018/0304520 A1 | 10/2018 | Asuka et al. |
| 2019/0161603 A1 | 5/2019 | Katsuno et al. |

FOREIGN PATENT DOCUMENTS

| | | |
|---|---|---|
| CN | 103753922 A | 4/2014 |
| EP | 1398344 A1 | 3/2004 |
| EP | 1726602 A1 | 11/2006 |
| EP | 2374840 A1 | 10/2011 |
| JP | H07-307146 A | 11/1995 |
| JP | 2006-016550 A | 1/2006 |
| JP | 2008-201814 A | 9/2008 |
| JP | 2009-227819 A | 10/2009 |
| JP | 2011-256258 A | 12/2011 |
| JP | 2012-092286 A | 5/2012 |
| JP | 2012-117078 A | 6/2012 |
| JP | 2012-176998 A | 9/2012 |
| JP | 2012-197434 A | 10/2012 |
| JP | 2013-517152 A | 5/2013 |
| JP | 2014-181250 A | 9/2014 |
| JP | 2016-022676 A | 2/2016 |
| JP | 2016-022679 A | 2/2016 |
| JP | 2017-043707 A | 3/2017 |
| JP | 2017-071767 A | 4/2017 |
| JP | 2018-030992 A | 3/2018 |
| JP | 2018-200796 A | 12/2018 |
| JP | 2019-023253 A | 2/2019 |
| KR | 10-2011-0101202 A | 9/2011 |
| WO | 2007/015416 A1 | 2/2007 |
| WO | 2010/079784 A1 | 7/2010 |
| WO | 2011/086823 A1 | 7/2011 |
| WO | 2012/105660 A1 | 8/2012 |
| WO | 2012/105661 A1 | 8/2012 |
| WO | 2017/047576 A1 | 3/2017 |
| WO | 2018/187255 A1 | 10/2018 |

OTHER PUBLICATIONS

Supplementary European Search Report issued in corresponding European Patent Application No. 20778207.9 dated May 31, 2022.
International Search Report issued in corresponding International Patent Application No. PCT/JP2020/011849 dated Jun. 16, 2020.
International Preliminary Report on Patentability and Written Opinion issued in corresponding International Patent Application No. PCT/JP2020/011849 dated Oct. 7, 2021.

*Primary Examiner* — Carlos Barcena
(74) *Attorney, Agent, or Firm* — Morgan, Lewis & Bockius LLP (57) ABSTRACT

The purpose of the present invention is to provide a separator which is for a power storage device, and which has high strength and can be thinned. The separator for a power storage device has a microporous membrane containing polyolefin as a main component, wherein the melt tension of the microporous membrane as measured at a temperature of 230° C. is 30 mN or less, and the melt flow rate (MFR) of the microporous membrane as measured under a load of 2.16 kg and at a temperature of 230° C. is 0.9 g/10 min or less.

13 Claims, 1 Drawing Sheet

SEPARATOR FOR POWER STORAGE DEVICE

FIELD

The present invention relates to a separator for a power storage device.

BACKGROUND

Microporous membranes, in particular, polyolefin-based microporous membranes, are used in many technical fields such as microfiltration membranes, battery separators, capacitor separators, and fuel cell materials, and in particular, are used as separators for secondary batteries such as lithium-ion batteries. Lithium-ion batteries are being studied for various applications such as small electronic devices including mobile phones and notebook personal computers, as well as hybrid vehicles and electric vehicles including plug-in hybrid vehicles.

In recent years, lithium-ion batteries having high energy capacity, high energy density, and high output characteristics have been demanded, and along therewith, there is an increasing demand for thin-film separators having high strength (for example, high puncture strength).

Patent Literature 1 describes a polypropylene resin composition for a microporous film having a specific melt flow rate (MFR) and molecular weight distribution (Mw/Mn) by GPC, and comprising 5 to 30 wt % of a polypropylene resin (X) having a long chain branch structure and 95 to 70 wt % of a polypropylene resin (Y) having a specific MFR and excluding the polypropylene resin (X).

Patent Literature 2 describes a microporous membrane comprising (a) a first layer containing 40.0 to 85.0 wt % of an isotactic polypropylene having an Mw of $6.0 \times 10^5$ or more, (b) a second layer containing a polyolefin, and (c) a third layer containing 40.0 to 85.0 wt % of an isotactic polypropylene having an Mw of $6.0 \times 10^5$ or more.

Patent Literature 3 describes a laminate microporous film comprising a first microporous film containing a first resin composition having a melting point $T_{mA}$, and a second microporous film containing a second resin composition having a melting point $T_{mB}$, which is lower than the melting point $T_{mA}$, and having an extensional viscosity of 18,000 to 40,000 Pa·s and a shear viscosity of 5,000 to 10,000 Pa·s.

Patent Literature 4 describes a propylene-based resin microporous film, composed of a propylene-based resin comprising 25 to 60 wt % of a component having a molecular weight of 50,000 or less and 19 to 30 wt % of a component having a molecular weight of 700,000 or more, and having a weight average molecular weight of 350,000 to 500,000 and a melt tension of 1.1 to 3.2 g.

Patent Literature 5 describes a polypropylene resin composition for microporous membrane formation, comprising, as an essential component, a propylene homopolymer having an ultimate viscosity [η] of 1 dl/g to less than 7 dl/g, a mesopentad fraction in the range of 94 to 99.5%, an integrated elution amount of 10% or less at the time of temperature increase to 100° C., a melting point of 153 to 167° C., and a top temperature of a maximum peak of 105 to 130° C. and a half width of the peak of 7.0° C. or less in an elution temperature-elution amount curve.

CITATION LIST

Patent Literature

[PTL 1] Japanese Unexamined Patent Publication (Kokai) No. 2018-030992

[PTL 2] Japanese Unexamined PCT Publication (Kohyo) No. 2013-517152

[PTL 3] Japanese Unexamined Patent Publication (Kokai) No. 2016-022676

[PTL 4] Japanese Unexamined Patent Publication (Kokai) No. 2012-092286

[PTL 5] WO 2010/079784

SUMMARY

Technical Problem

It is known that a high-strength microporous membrane can be provided by using a polyolefin having a high molecular weight as the polyolefin constituting the microporous membrane. However, when a high molecular weight polyolefin is used, the viscosity at the time of melting becomes high, whereby thin membrane formation is difficult. Conversely, when the viscosity at the time of melting is reduced (the MFR is increased), strength tends to be reduced. For example, in Patent Literature 1 to 5 described above, thin membrane formation cannot be achieved since the melt tension is excessively high, or even if the melt tension is sufficiently reduced, the MFR is excessively high and strength is low, making it impossible to produce a high-strength thin-film separator.

Thus, the present invention aims to provide a separator for a power storage device, in which the separator has high strength and thin membrane formation is possible.

Solution to Problem

As a result of rigorous investigation in order to solve the above problems, the present inventors have discovered that the above problems can be solved by using a microporous membrane comprising, as a primary component, a polyolefin having a specific melt tension and melt flow rate (MFR), and have completed the present invention.

Examples of embodiments of the present invention are arranged in Items [1] to [13] below.

[1]

A separator for a power storage device, comprising a microporous membrane containing a polyolefin as a primary component, wherein a melt tension of the microporous membrane measured at a temperature of 230° C. is 30 mN or less, and a melt flow rate (MFR) of the microporous membrane measured under a load of 2.16 kg at a temperature of 230° C. is 0.9 g/10 min or less.

[2]

The separator for a power storage device according to Item 1, wherein an area ratio (MD/TD) of (110) crystal peak as measured by wide-angle X-ray scattering of the microporous membrane containing a polyolefin as a primary component is 1.3 or more.

[3]

The separator for a power storage device according to Item 1 or 2, wherein the polyolefin is polypropylene, and the MFR of the polypropylene measured under a load of 2.16 kg at a temperature of 230° C. is 0.3 to 0.9 g/10 min.

[4]

The separator for a power storage device according to Item 3, wherein a pentad fraction of the polypropylene as measured by $^{13}$C-NMR (nuclear magnetic resonance) is 95.0% or more.

[5]

The separator for a power storage device according to Item 4, wherein the pentad fraction of the polypropylene is 97.0% or more.

[6]

The separator for a power storage device according to any one of Items 1 to 5, wherein the melt tension of the microporous membrane is 20 mN to 30 mN.

[7]

The separator for a power storage device according to any one of Items 1 to 6, wherein a value (Mw/Mn) obtained by diving the weight average molecular weight (Mw) of the polypropylene by the number average molecular weight (Mn) thereof is 7 or less.

[8]

The separator for a power storage device according to Item 1 or 2, wherein the polyolefin is polypropylene, the microporous membrane further comprises an elastomer, and the MFR of the polypropylene measured under a load of 2.16 kg at a temperature of 230° C. is 0.6 g/10 min or less.

[9]

The separator for a power storage device according to Item 8, wherein the elastomer has a propylene structure as a repeating unit.

[10]

The separator for a power storage device according to Item 8 or 9, wherein a pentad fraction of the polypropylene as measured by $^{13}$C-NMR (nuclear magnetic resonance) is 95.0% or more.

[11]

The separator for a power storage device according to any one of Items 1 to 10, wherein the separator for a power storage device has a multilayer structure comprising the microporous membrane and a microporous membrane containing a polyethylene as a primary component.

[12]

The separator for a power storage device according to Item 11, wherein a thickness of the multilayer structure is 18 μm or less, and the separator for a power storage device has an air permeability of 300 s/100 cc·14 μm or less, and a puncture strength of 300 gf/14 μm or more, which are calculated by converting the thickness into 14 μm.

[13]

A power storage device, comprising a positive electrode, a negative electrode, and the separator for a power storage device according to any one of Items 1 to 12 laminated between the positive electrode and the negative electrode.

Advantageous Effects of Invention

According to the present invention, there can be provided a separator for a power storage device, in which the separator has high strength and thin membrane formation is possible. Note that the above descriptions should not be considered to disclose all of the embodiments of the present invention and all of the advantages of the present invention. Further embodiments of the present invention and the advantages thereof will become apparent with reference to the following descriptions.

DESCRIPTION OF EMBODIMENTS

Figure 1:
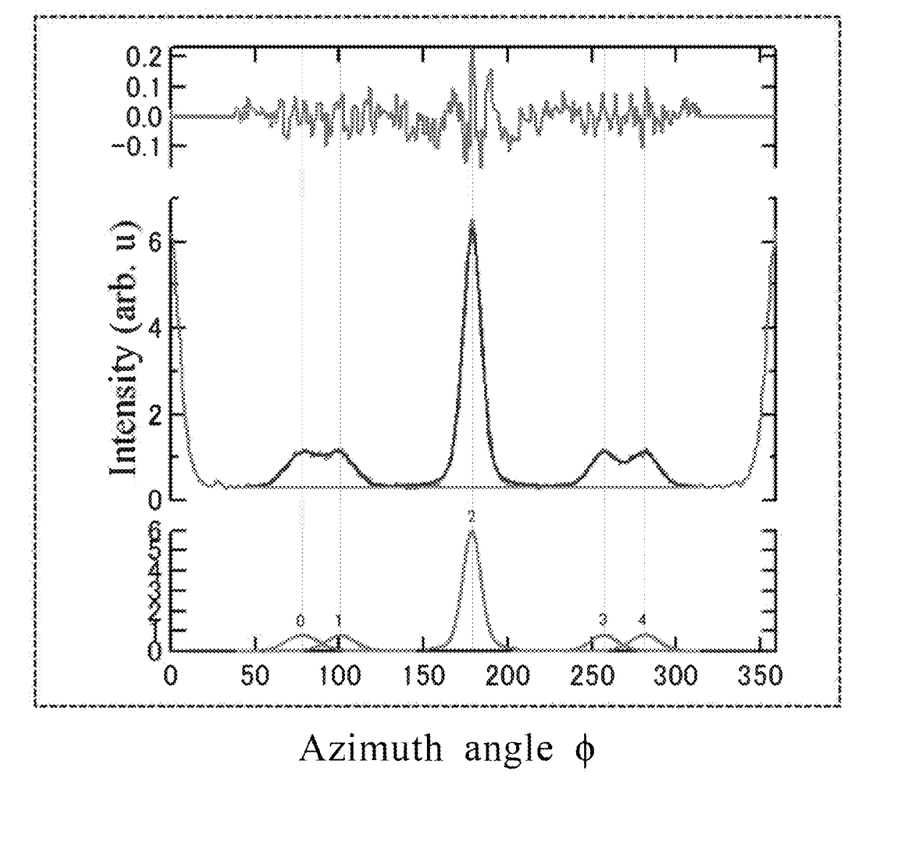
The FIGURE is an example of an azimuth angle distribution of scattering intensity detailing measurement of the (110) crystal peak area ratio (MD/TD) in wide-angle X-ray scattering.

The embodiments (hereinafter referred to as "the present embodiment") of the present invention will be described in detail below for exemplary purposes, but the present invention is not limited to the present embodiment.

<<Separator for a Power Storage Device>>

<Microporous Membrane>

The separator for a power storage device of the present application is a separator for a power storage device comprising a microporous membrane containing a polyolefin as a primary component. In the present embodiment, "microporous membrane" refers to a single-layer microporous membrane constituting a separator for a power storage device, and a single layer thereof may be used or two or more layers thereof may be laminated and used as a multilayer membrane. In the present embodiment, "microporous membrane containing a polyolefin as a primary component" means a microporous membrane containing 50 mass % or more of a polyolefin based on the total mass of the microporous membrane. From the viewpoints of membrane wettability, thin membrane formation, and shutdown characteristics, the lower limit of the content of polyolefin in the microporous membrane is preferably 55 mass % or more, and more preferably 60 mass % or more, 70 mass % or more, 80 mass % or more, 90 mass % or more, or 95 mass % or more. The upper limit of the content of polyolefin in the microporous membrane is not particularly limited, and may be, for example, 60 mass % or less, 70 mass % or less, 80 mass % or less, 90 mass % or less, 95 mass % or less, 98 mass % or less, or 99 mass % or less, or may be 100 mass %.

<Polyolefin>

Polyolefins are polymers containing a monomer having a carbon-carbon double bond as a repeating unit. The monomer constituting the polyolefin is not limited, and examples thereof include monomers having a carbon-carbon double bond and having 1 to 10 carbon atoms, such as ethylene, propylene, 1-butene, 4-methyl-1-pentene, 1-hexene, and 1-octene. The polyolefin can be a homopolymer, a copolymer, or multi-stage polymer, and is preferably a homopolymer.

As the polyolefin, specifically, from the viewpoint of shutdown characteristics, polyethylene, polypropylene, copolymers thereof, and mixtures thereof are preferable. The polyolefin is more preferably polypropylene.

The tacticity of the polypropylene is not limited, and it can be an atactic, isotactic, or syndiotactic homopolymer. The polypropylene is preferably an isotactic or syndiotactic high crystalline homopolymer.

The polypropylene is preferably a homopolymer, and may be a copolymer, for example, a block polymer obtained by copolymerizing a small amount of comonomer other than propylene, for example, an α-olefin comonomer. The amount of propylene structure contained in the polypropylene as repeating units is not limited, and may be, for example, 70% or more, 80% or more, or 90% or more. The amount of repeating units derived from the comonomer other than the propylene structure contained in the polypropylene is not limited, and may be, for example, 10% or less, 5% or less, or 1% or less. The polypropylene can be used alone or an admixture of two or more types thereof can be used.

The weight average molecular weight (Mw) of the polyolefin, from the viewpoint of strength of the microporous membrane, is preferably 10,000 to 2,000,000, more preferably 20,000 to 1,500,000, further preferably 30,000 to 1,500,000, even further preferably 50,000 to 1,500,000, and particularly preferably 70,000 to 1,500,000.

The upper limit value of the value (Mw/Mn) obtained by diving the weight average molecular weight (Mw) of the polyolefin by the number average molecular weight (Mn) thereof is preferably 7 or less, and may be, for example, 6.5 or less, 6 or less, 5.5 or less, or 5 or less. By minimizing the value of Mw/Mn, which is the index of the molecular weight distribution, entanglement between molecules is reduced and melt tension is therefore reduced. Thus, it is preferably that the value of Mw/Mn of the polyolefin be 7 or less in order to control the melt tension to 30 mN or less. Furthermore, Mw/Mn is preferably 1 or more, and may be, for example, 1.3 or more, 1.5 or more, 2.0 or more, or 2.5 or more. By setting Mw/Mn to 1 or more, appropriate molecular entanglement may be maintained and stability during membrane formation may be improved.

When the polyolefin is polypropylene, from the viewpoint of strength of the microporous membrane, the weight average molecular weight (Mw) of the polypropylene is preferably 10,000 to 2,000,000, more preferably 20,000 to 1,500,000, further preferably 30,000 to 1,500,000, even further preferably 50,000 to 1,500,000, and particularly preferably 70,000 to 1,500,000.

The upper limit value of the value (Mw/Mn) obtained by dividing the weight average molecular weight (Mw) of the polypropylene by the number average molecular weight (Mn) thereof is preferably 7 or less, and may be, for example, 6.5 or less, 6 or less, 5.5 or less, or 5 or less. When the value of Mw/Mn, which is an index of the molecular weight distribution, is small, there is an effect that the melt tension becomes small. Thus, it is preferable that the value of Mw/Mn of the polypropylene be 7 or less in order to control the melt tension to 30 mN or less. Further, Mw/Mn is preferably 1 or more, and may be, for example, 1.3 or more, 1.5 or more, 2.0 or more, 2.5 or more. When Mw/Mn is 1 or more, appropriate molecular entanglement may be maintained, and stability during membrane formation may be improved. Note that the weight average molecular weight, number average molecular weight, and Mw/Mn of the polyolefin of the present embodiment are polystyrene-equivalent molecular weights obtained by measurement by GPC (Gel Permeation Chromatography).

The density of the polyolefin is preferably 0.85 g/cm$^3$ or more, and may be, for example, 0.88 g/cm$^3$ or more, 0.89 g/cm$^3$ or more, or 0.90 g/cm$^3$ or more. The density of the polyolefin is preferably 1.1 g/cm$^3$ or less, and may be, for example, 1.0 g/cm$^3$ or less, 0.98 g/cm$^3$ or less, 0.97 g/cm$^3$ or less, 0.96 g/cm$^3$ or less, 0.95 g/cm$^3$ or less, 0.94 g/cm$^3$ or less, 0.93 g/cm$^3$ or less, or 0.92 g/cm$^3$ or less. The density of the polyolefin is related to the crystallinity of the polyolefin, and when the density of the polyolefin is 0.85 g/cm$^3$ or more, the productivity of the microporous membrane is improved, which is advantageous particularly in dry methods.

<Melt Tension>

The upper limit value of the melt tension of the microporous membrane when measured at a temperature of 230° C. is, from the viewpoint of moldability of the microporous membrane, 30 mN or less, for example, 25 mN or less. The lower limit value of the melt tension (single-layer melt tension) of the microporous membrane is not limited, and from the viewpoint of strength of the microporous membrane, may be, for example, 10 mN or more, 15 mN or more, or 20 mN or more.

It is generally considered that it is preferable that the melt tension of the microporous membrane be high from the viewpoint of the strength of the microporous membrane. However, in the present embodiment, even if the melt tension of the microporous membrane is 30 mN or less, the strength of the microporous membrane can be maintained. The reason for this was unclear at the time of filing, and is not limited by theory. The inventors presume that this is due to reductions in stress by controlling the melt flow rate (MFR) of the microporous membrane to 0.9 g/10 min or less, and setting the melt tension to 30 mN or less, even if a non-uniform structure or temperature distribution which causes stress concentration in the membrane occurs. Furthermore, by setting the melt tension of the microporous membrane to 30 mN or less, the moldability of the microporous membrane is excellent, whereby in particular, when a thin-film microporous membrane is molded, rupture thereof can be suppressed. This advantage is remarkable when the microporous membrane is produced by a method in which a strong stretching orientation is applied, in particular in dry methods.

When the polyolefin is polypropylene, the upper limit value of the melt tension of the polypropylene when measured at a temperature of 230° C. is, from the viewpoint of moldability of the microporous membrane, 30 mN or less, for example, 25 mN or less. The lower limit value of the melt tension of the polypropylene is not limited, and from the viewpoint of strength of the microporous membrane, may be, for example, 10 mN or more, 15 mN or more, or 20 mN or more.

<Melt Flow Rate (MFR)>

The upper limit value of the melt flow rate (MFR) (single-layer MFR) of the microporous membrane when measured under a load of 2.16 kg at a temperature of 230° C. is, from the viewpoint of obtaining a higher-strength microporous membrane, 0.9 g/10 min or less, and may be, for example, 0.85 g/10 min or less, 0.7 g/10 min or less, 0.65 g/10 min or less, or 0.5 g/10 min or less. The lower limit value of the MFR (single-layer MFR) of the microporous membrane is not limited, from the viewpoint of moldability of the microporous membrane, and may be, for example, 0.2 g/10 min or more, 0.25 g/10 min or more, 0.3 g/10 min or more, 0.35 g/10 min or more, 0.38 g/10 min or more, 0.4 g/10 min or more, 0.45 g/10 min or more, 0.5 g/10 min or more, 0.55 g/10 min or more, 0.6 g/10 min or more, 0.65 g/10 min or more, or 0.7 g/10 min or more.

Setting the MFR of the microporous membrane to 0.9 g/10 min or less means that the molecular weight of the polyolefin contained in the microporous membrane is high to some degree. Since the molecular weight of polyolefin is high, the number of tie molecules binding the crystals to each other increases, whereby a high-strength microporous membrane tends to be obtained. Further, as described above, in the present embodiment, by setting the melt tension of the microporous membrane to 30 mN or less, the moldability of the thin-film microporous membrane is excellent. Thus, setting the melt tension of the microporous membrane to 30 mN or less and the MFR to 0.9 g/10 min or less brings about the advantage that a high strength thin membrane separator for a power storage device can be obtained. By setting the MFR of the microporous membrane to 0.2 g/10 min or more, the melt tension of the microporous membrane does not become excessively low, whereby a thin-film microporous membrane having a high strength can more easily be obtained.

When the polyolefin is polypropylene, from the viewpoint of obtaining a high-strength microporous membrane, the MFR of the polypropylene when measured under a load of 2.16 kg at a temperature of 230° C. is preferably 0.3 to 0.9 g/10 min. The upper limit value of the MFR of the polypropylene, from the viewpoint of obtaining a higher-strength microporous membrane, may be, for example, 0.85 g/10 min or less, 0.7 g/10 min or less, 0.65 g/10 min or less, 0.6 g/10 min or less, 0.55 g/10 min or less, or 0.5 g/10 min or less. The lower limit value of the MFR or the polypropylene is not limited, and from the view point of moldability of the microporous membrane, may be, for example, 0.35 g/10 min or more, 0.4 g/10 min or more, 0.45 g/10 min or more, 0.5 g/10 min or more, 0.55 g/10 min or more, 0.6 g/10 min or more, 0.65 g/10 min or more, or 0.7 g/10 min or more.

<Wide-Angle X-Ray Scattering>

The lower limit value of the (110) crystal peak area ratio (MD/TD) when the microporous membrane of the present embodiment is measured by wide-angle X-ray scattering is preferably 1.3 or more, and may be, for example, 2 or more, 2.5 or more, 3 or more, 3.5 or more, 4 or more, 4.5 or more, or 5 or more. The upper limit value of the orientation ratio (MD/TD) is not limited, and may be, for example, 12 or less, 10 or less, 8 or less, 6 or less, 5.5 or less, 5 or less, 4.5 or less, or 4 or less. Note that as used herein, the "machine direction" (or abbreviated as "MD") means the machine direction in microporous membrane continuous molding, and the "transverse direction" (or abbreviated as "TD") means the direction intersecting the MD at an angle of 90°.

The (110) crystal peak area ratio (MD/TD) of the microporous membrane as measured by wide-angle X-ray scattering being 1.3 or more means that the polymer molecular chains constituting the microporous membrane are strongly oriented in the MD. When a microporous membrane is produced by a method in which strong MD stretching is applied to the microporous membrane, in particular by a dry method of MD stretching, the orientation ratio (MD/TD) tends to be 1.3 or more. The advantages of the high-strength thin-film microporous membrane of the present embodiment are not limited, and are remarkable when the microporous membrane is produced by a dry method of MD stretching, and thus, the (110) crystal peak area ratio (MD/TD) as measured by wide-angle X-ray scattering is preferably 1.3 or more.

<Pentad Fraction>

When the polyolefin is polypropylene, in the present embodiment, the lower limit value of the pentad fraction of the polypropylene as measured by $^{13}$C-NMR (nuclear magnetic resonance), from the viewpoint of obtaining a microporous membrane having a low air permeability, is preferably 95.0% or more, and may be, for example, 96.0% or more, 96.5% or more, 97.0% or more, 97.5% or more, 98.0% or more, 98.5% or more, or 99.0% or more. The upper limit value of the pentad fraction of the polypropylene is not limited, and may be, for example, 99.9% or less, 99.8% or less, or 99.5% or less.

When the pentad fraction of the polypropylene is 95.0% or more, the crystallinity of the polypropylene becomes high. Since a microporous membrane obtained by a stretching/pore-forming method, in particular, a dry method, pores are formed by stretching the amorphous portions between the crystalline materials, high crystallinity of the polypropylene is preferable because the air permeability thereof can be controlled so as to be low.

<Elastomer>

In the present embodiment, the microporous membrane containing a polyolefin as a primary component may further contain an elastomer other than the polyolefin. In the microporous membrane, the polyolefin is polypropylene, and there may further be contained an elastomer other than the polyolefin. By including an elastomer in the microporous membrane, since the melt tension can be reduced without impairing the balance between strength and air permeability, thin membrane formation of even a polyolefin having a low MFR and a high melt tension is possible, whereby a high-strength thin-film separator can be obtained.

When the microporous membrane further contains an elastomer other than the polyolefin, the upper limit value of the MFR of the polypropylene when measured under a load of 2.16 kg at a temperature of 230° C. is preferably, from the viewpoint of strength of the microporous membrane, 0.6 g/10 min or less, and may be, for example, 0.5 g/10 min or less, 0.45 g/10 min or less, 0.4 g/10 min or less, or 0.3 g/10 min or less. When the microporous membrane further contains an elastomer other than the polyolefin, the lower limit value of the MFR of the polypropylene may be, from the viewpoint of moldability of the microporous membrane, for example, 0.1 g/10 min or more, 0.15 g/10 min or more, 0.2 g/10 min or more, or 0.25 g/10 min or more.

Examples of the elastomer include ethylene/α-olefin copolymers, ethylene/styrene copolymers, propylene/α-olefin copolymers, 1-butene/α-olefin copolymers, block copolymers of styrene and butadiene (SBS) and hydrogenated polymers thereof (SEBS), and block copolymers of styrene and isoprene (SIS) and hydrogenated polymers thereof (SEPS). Examples of the elastomer include high molecular weight compounds in which long-chain branches are copolymerized by chain transfer during polymerization, such as linear low-density polyethylene or ultra-low-density polyethylene. Examples of the α-olefin include aliphatic α-olefins such as propylene, 1-butene, 1-hexene, 1-octene, and 4-methyl-1-pentene. As the elastomer, one may be used alone, or two or more types may be used in combination.

As the elastomer, an elastomer containing a C2 to C10 alkylene structure as the repeating unit thereof is preferable. Examples of the C2 to C10 alkylene structure include an ethylene structure, a propylene structure, a 1-butene structure, a pentene structure, a hexene structure, a heptene structure, an octene structure, a nonene structure, and a decane structure.

As the elastomer, an elastomer containing a propylene structure as the repeating unit thereof is further preferable.

When the microporous membrane further contains an elastomer other than the polyolefin, the content of the elastomer, based on the total mass of the microporous membrane, is preferably 0.1 mass % to 20 mass %, more preferably 1 mass % to 18 mass %, and further preferably 2 mass % to 14 mass %. The mass ratio of the polyolefin (A) to the elastomer (B) contained in the microporous membrane is preferably (A)/(B)=99.9/0.1 to 80/20, more preferably 99/1 to 82/18, and further preferably 98/2 to 86/14. By setting the content of the elastomer to greater than 0.1 mass %, a thin-film microporous membrane tends to be obtained. By setting the content ratio of the elastomer to 20 mass % or less, porosity is improved, air permeability is reduced, and the balance between low air permeability and high strength tends to be improved.

The upper limit value of the MFR of the elastomer when measured at 230° C., from the viewpoint of strength of the microporous membrane, is preferably 15 g/10 min or less, and may be, for example, 10 g/10 min or less, 9 g/10 min or less, 8 g/10 min or less, or 7.5 g/10 min or less. The lower limit value of the MFR of the elastomer, from the viewpoint of moldability of the microporous membrane, may be, for example, 0.1 g/10 min or more, 1 g/10 min or more, 3 g/10 min or more, or 5 g/10 min or more.

The lower limit value of the melting point of the elastomer is not limited, and from the viewpoint of strength of the microporous membrane, it may be, for example 40° C. or higher, 50° C. or higher, 60° C. or higher, 70° C. or higher, 80° C. or higher, 90° C. or higher, or 100° C. or higher. The upper limit value of the melting point of the elastomer is not limited, and from the viewpoint of moldability of the microporous membrane, it may be, for example, 180° C. or lower, 160° C. or lower, 140° C. or lower, 120° C. or lower, or 100° C. or lower.

<Multilayer Structure>

The separator for a power storage device may comprise the microporous membrane containing a polyolefin as a primary component described above as a single layer, or may comprise a multilayer structure in which the microporous membrane containing a polyolefin as a primary component described above and a further microporous membrane containing polyethylene as a primary component are laminated. The further microporous membrane containing polyethylene as a primary component may be a polyethylene microporous membrane having the specific melt tension and melt flow rate (MFR) described above, or may be a polyethylene microporous membrane which does not have these characteristics. Since polyethylene has a melting point suitable for melt shutdown, from the viewpoint of shutdown characteristics, it is preferable that a further microporous membrane containing polyethylene as a primary component be included.

"Multilayer structure" means a structure of two or more layers comprising the microporous membrane containing a polyolefin as a primary component of the present embodiment, and a multilayer structure in which three or more layers of the microporous membrane are laminated is preferable. It is further preferable that the multilayer structure comprise at least two layers of the microporous membranes containing a polyolefin as a primary component of the present embodiment and at least one further microporous membrane containing polyethylene as a primary component. It is further preferable that the multilayer structure comprise at least two layers of the microporous membrane (PP microporous layer) containing polypropylene as a primary component of the present embodiment and at least one further microporous membrane (PE microporous layer) containing polyethylene as a primary component.

Though the multilayer structure can exhibit the effects of the present invention regardless of the order of lamination, a three-layer structure in which a PP microporous layer/PE microporous layer/PP microporous layer are laminated in this order is particularly preferable. By including a three-layer structure, PP microporous layer/PE microporous layer/PP microporous layer, mechanical strength can be maintained by the PP microporous layers while providing the shutdown characteristics by the PE microporous layer. The PP microporous layers are the microporous membranes of the present embodiment having the specific melt tension and melt flow rate (MFR) described above. Conversely, the intermediate PE microporous layer may be a polyethylene microporous member having the specific melt tension and melt flow rate (MFR) described above, or may be a polyethylene microporous membrane which does not have these characteristics.

It is not necessarily indispensable that the multilayer structure have both a PP microporous layer and a PE microporous layer. For example, a laminate structure comprising only PP microporous layers such as PP microporous layer (A)/PP microporous layer (B)/PP microporous layer (C) may be used. In this case, at least one of the layers constituting the multilayer structure (in the example above, (A), (B), and (C)) is required to be the PP microporous layer of the present embodiment, and two layers or three layers may be the PP microporous layer of the present embodiment.

<Single-Layer Structure>

The power storage device separator may have the microporous membrane containing a polyolefin as a primary component described above as a single layer. By adopting a single-layer structure, production costs can be reduced. Furthermore, by using the microporous membrane containing a polyolefin as a primary component of the present embodiment as a single-layer structure, thinner membrane formation of the separator is made possible, and a high-strength separator can be provided.

<Thickness>

The upper limit value of the thickness (thickness as a single layer in the multilayer structure) of the microporous membrane in the multilayer structure of the present embodiment included in the separator for a power storage device of the present embodiment, from the viewpoint of high-energy densification of the power storage device, is preferably 10 μm or less, and may be, for example, 8 μm or less, 7 μm or less, 6 μm or less, 5 μm or less, 4.5 μm or less, or 4 μm or less. The lower limit value of the thickness (thickness as a single layer in the multilayer structure) of the microporous membrane in the multilayer structure of the present embodiment, from the viewpoint of strength, is preferably 1 μm or more, and may be, for example, 2 μm or more, 3 μm or more, 3.5 μm or more, 4 μm or more, or 4.5 μm or more.

When the separator for a power storage device has a multilayer structure of microporous membranes, the upper limit value of the thickness of the entire multilayer structure, from the viewpoint of high-energy densification of the power storage device, is preferably 18 μm or less, and may be, for example, 16 μm or less, 15 μm or less, 14 μm or less, 13.5 μm or less, 13 μm or less, 12.5 μm or less, or 12 μm or less. The lower limit value of the thickness of the entire multilayer structure, from the viewpoint of strength, is preferably 3 μm or more, and may be, for example, 5 μm or more, 6 μm or more, 7 μm or more, 8 μm or more, or 9 μm or more.

When the separator for a power storage device is constituted by a single-layer structure of a microporous membrane, the upper limit value of the single-layer structure separator, from the viewpoint of high-energy densification of the power storage device, is preferably 16 μm or less, and may be, for example, 15 μm or less, 14 μm or less, 13 μm or less, 12 μm or less, 11 μm or less, 10 μm or less, or 9 μm or less. The lower limit value of the thickness of the single-layer structure separator, from the viewpoints of handling properties and strength, is preferably 3 μm or more, and may be, for example, 4 μm or more, 5 μm or more, 6 μm or more, 7 μm or more, or 8 μm or more.

<Air Permeability (Air Resistance)>

When the separator for a power storage device has a multilayer structure of microporous membranes, the upper limit value of the air permeability of the multilayer structure, when the thickness of the multilayer structure is converted to 14 μm, is preferably 300 s/100 cc·14 μm or less, and may be, for example, 290 s/100 cc·14 μm or less, 280 s/100 cc·14 μm or less, 270 s/100 cc·14 μm or less, or 260 s/100 cc·14 μm or less. The lower limit value of the air permeability of the multilayer structure is not limited, and may be, for example, 200 s/100 cc·14 μm or more, 210 s/100 cc·14 μm or more, or 220 s/100 cc·14 μm or more.

<Puncture Strength>

When the separator for a power storage device has a multilayer structure of microporous membranes, the lower limit value of the puncture strength of the multilayer structure, when the thickness of the entire multilayer structure is converted to 14 µm, is preferably 300 gf/14 µm or more, and may be, for example, 310 gf/14 µm or more, 320 gf/14 µm or more, 330 gf/14 µm or more, 340 gf/14 µm or more, 350 gf/14 µm or more, or 360 gf/14 µm or more. The upper limit value of the puncture strength of the multilayer structure is not limited, and when the thickness of the entire multilayer structure is converted to 14 µm, is preferably 550 gf/14 µm or less, and may be, for example, 500 gf/14 µm or less, or 480 gf/14 µm or less.

<Balance Between Thickness, Air Permeability, and Puncture Strength>

By adopting a microporous membrane containing a polyolefin as a primary component having the specific melt tension and melt flow rate (MFR) as described above in the separator for a power storage device according to the present embodiment, though it is a thin film, a separator for a power storage device with low air permeability and high strength can be obtained. For example, it is further preferable that the separator for a power storage device of the present embodiment have a multilayer structure of microporous membranes, and that the thickness of the multilayer structure be 18 µm or less, the air permeability when the thickness of the multilayer structure is converted to 14 µm be 300 s/100 cc·14 µm or less, and the puncture strength be 300 gf/14 µm or more. It is even further preferable that the thickness of the multilayer structure be 18 µm or less, the thickness (thickness as a single layer) of the microporous membrane of the present embodiment included in the multilayer structure be 6 µm or less, the air permeability when the thickness of the multilayer structure is converted to 14 µm be 300 s/100 cc·14 µm or less, and the puncture strength be 300 gf/14 µm or more.

<<Separator for Power Storage Device Production Method>>

Methods for the production of microporous membranes containing a polyolefin as a primary component generally comprise a melt extrusion step of melt-extruding a polyolefin resin composition to obtain a resin film, and a pore-forming step of forming pores in the obtained resin sheet to make it porous, and may further optionally comprise a stretching step and a heat-treatment step. Methods for the production of a microporous membrane can be roughly classified into dry methods in which a solvent is not used in the pore-forming step and wet methods in which a solvent is used.

Examples of dry methods include a method in which a polyolefin resin composition is melt-kneaded and extruded, and the polyolefin crystal interface is then exfoliated by heat treatment and stretching, and a method in which a polyolefin resin composition and an inorganic filler are melt-kneaded and molded on a sheet, and the interface between the polyolefin and the inorganic filler is then peeled off by stretching.

Examples of wet methods include a method in which a polyolefin resin composition and a pore-forming material are melt-kneaded, formed into a sheet, stretched as needed, and the pore-forming material is then extracted, and a method in which a polyolefin resin composition is dissolved, and then immersed in a poor solvent for the polyolefin to coagulate the polyolefin and simultaneously remove the solvent.

A single-screw extruder or a twin-screw extruder can be used for melt-kneading the polyolefin resin composition, and in addition thereto, for example, a kneader, a Labo Plastomill, a kneading roller, or a Banbury mixer can also be used.

The polyolefin resin composition may optionally comprise a resin other than a polyolefin and an additive depending the method for the production of the microporous membrane or depending on the desired physical properties of the microporous membrane. Examples of additives include pore-forming materials, fluorine-based flow modifiers, waxes, crystal nucleating agents, antioxidants, metal soaps such as aliphatic carboxylic acid metal salts, UV absorbers, light stabilizers, antistatic agents, anti-fog agents, and pigments. Examples of pore-forming materials include plasticizers, inorganic fillers and combinations thereof.

Examples of plasticizers include hydrocarbons such as liquid paraffin and paraffin wax; esters such as dioctyl phthalate and dibutyl phthalate; and higher alcohols such as oleyl alcohol and stearyl alcohol.

Examples of inorganic fillers include oxide-based ceramics such as alumina, silica (silicon oxide), titania, zirconia, magnesia, ceria, yttria, zinc oxide, and iron oxide; nitride-based ceramics such as silicon nitride, titaniumnitride, and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth, and silica sand; and glass fibers.

The stretching step may be performed during the pore-forming step or before or after the pore-forming step. As the stretching treatment, either uniaxial stretching or biaxial stretching can be used. Though not limited, uniaxial stretching is preferable from the viewpoint of production cost when a dry method is used. Biaxial stretching is preferable from the viewpoint of improving the strength of the obtained microporous membrane. Examples of biaxial stretching include, for example, methods such as simultaneous biaxial stretching, sequential biaxial stretching, multi-stage stretching, and multiple stretching. Simultaneous biaxial stretching is preferable from the viewpoint of improving puncture strength, stretching uniformity, and shutdown property. Furthermore, from the viewpoint of ease of controlling the plane orientation, sequential biaxial stretching is preferable. When a sheet-shaped molded body is stretched at a high magnification in the biaxial direction, the molecules thereof are oriented in the planar direction, and thus, tearing is less likely to occur and a microporous membrane having a high puncture strength tends to be obtained.

Simultaneous biaxial stretching is a stretching method in which MD stretching and TD stretching are performed simultaneously. The stretching ratios in the respective directions may be different or the same. Sequential biaxial stretching refers to a stretching method in which MD and TD stretching are performed independently and sequentially, and when MD or TD stretching is performed the other direction is unconstrained or fixed to a predetermined length.

In order to suppress shrinkage of the microporous film, a heat treatment step may be performed for the purpose of heat fixation after the stretching step or the pore-forming step. The heat treatment process may include, for the purpose of adjusting physical properties, a stretching operation performed in a predetermined temperature atmosphere and at a predetermined stretching rate, and/or a relaxation operation performed in a predetermined temperature atmosphere and at a predetermined relaxation rate for the purpose of reducing stretching stress. The relaxation operation may be performed after the stretching operation. These heat treatment steps can be performed using a tenter or a roll-stretching machine.

Examples of the method for the production of the separator for a power storage device having a multilayer structure in which a plurality of microporous membranes including the microporous membrane of the present embodiment are laminated include coextrusion methods and lamination methods. In coextrusion methods, a microporous membrane can be produced by coextruding the resin compositions of the respective layers simultaneously and subjecting the obtained multilayer raw material film to stretching and pore-forming. In lamination methods, each layer is separately formed by extrusion membrane formation to obtain a raw material film. By laminating the obtained raw material film, a multilayer raw material film can be obtained, and the obtained multilayer raw material film can be stretched and pores formed therein to prepare a microporous membrane. In lamination methods, since each layer can be formed into a film separately, a more finely controlled pore structure can be formed, and in that respect, a preferable separator can be obtained. Examples of lamination methods include dry laminating methods using an adhesive, and thermal lamination methods in which a plurality of layers are bonded by heating.

<<Power Storage Device>>

The power storage device according to the present embodiment comprises a positive electrode, a negative electrode, and the separator for a power storage device according to the present embodiment described above. The separator for a power storage device is laminated between the positive electrode and the negative electrode.

The power storage device is not limited, and examples thereof include a lithium secondary battery, a lithium-ion secondary battery, a sodium secondary battery, a sodium-ion secondary battery, a magnesium secondary battery, a magnesium-ion secondary battery, a calcium secondary battery, a calcium-ion secondary battery, an aluminum secondary battery, an aluminum-ion secondary battery, a nickel hydrogen battery, a nickel cadmium battery, an electric double-layer capacitor, a lithium-ion capacitor, a redox flow battery, a lithium sulfur battery, a lithium air battery, and a zinc air battery. Among these, from the viewpoint of practicality, a lithium secondary battery, a lithium-ion secondary battery, a nickel hydrogen battery, or a lithium-ion capacitor is preferable, and a lithium-ion secondary battery is more preferable.

The power storage device can be produced, for example, by overlapping a positive electrode and a negative electrode via the separator described above, winding as necessary to form a laminate electrode body or a wound electrode body, and thereafter loading the laminate electrode body or wound electrode body into an outer casing, connecting the positive and negative electrodes to positive and negative electrode terminals of the outer casing via a lead body, and sealing the outer casing after injecting a non-aqueous electrolyte containing a non-aqueous solvent such as a chain or cyclic carbonate and an electrolyte such as a lithium salt into the outer casing.

EXAMPLES

The present invention will be more specifically described below by way of Examples and Comparative Examples, but the present invention is not limited to the Examples below.

<<Measurement and Evaluation Methods>>

[Melt Flow Rate (MFR) Measurement]

The melt flow rate (MFR) of the microporous membrane is measured in accordance with JIS K7210 under the conditions of a temperature of 230° C. and a load of 2.16 kg (unit: g/10 min). The MFR of polypropylene is measured in accordance with JIS K7210 under the conditions of a temperature of 230° C. and a load of 2.16 kg. The melt flow rate (MFR) of polyethylene is measured in accordance with JIS K7210 under the conditions of a temperature of 190° C. and a load of 2.16 kg. The MFR of the elastomer is measured in accordance with JIS K7210 under the conditions of a temperature of 230° C. and a load of 2.16 kg.

[GPC (Gel Permission Chromatography) Measurement]

Using an Agilent PL-PGC 220, a calibration curve is created by measuring standard polystyrene under the following conditions. The chromatograph of a sample polymer is measured under the same conditions, and based on the calibration curve, the weight average molecular weight (Mw), number average molecular weight (Mn), and the value (Mw/Mn) obtained by dividing the weight average molecular weight (Mw) by the number average molecular weight (Mn) of the polystyrene conversion of the polymer under the following conditions are calculated.

Column: TSKgel GMHhr-H (20) HT (7.8 mm ID×30 cm), two columns

Mobile phase: 1,2,4-trichlorobenzene

Detector: RI

Column temperature: 160° C.

Sample concentration: 1 mg/ml

Calibration curve: polystyrene

[Melt Tension Measurement]

Using a capilograph manufactured by Toyo Seiki Seisakusho, Ltd., the melt tension (mN) of the microporous membrane is measured under the following conditions.

Capillary: 1.0 mm diameter, 20 mm length

Cylinder extrusion speed: 2 mm/min

Drawing speed: 60 μm/min

Temperature: 230° C.

[Wide-Angle X-ray Scattering Measurement]

The (110) crystal peak area ratio (MD/TD) of the polypropylene microporous membrane is measured by the transmission method wide-angle X-ray scattering (WAXS). The WAXS measurement is carried out under the following conditions.

Device name: NANOPIX, Rigaku Corporation

X-ray wavelength λ:0.154 nm

Optical system: Point collimation $1^{st}$ slit: 0.55 mmφ

$2^{nd}$ slit: Open $3^{rd}$ slit: 0.35 mmφ

Exposure time: 900 seconds

Detector: HyPix-6000 (two-dimensional detector)

Camera length: 85.7 mm

X-rays are emitted onto one sample film from the film normal direction, and transmitted scattered light is detected. In order to reduce scattering from outside of the sample to the greatest degree possible, measurement is performed using a vacuum chamber installed in a vacuum from the sample to the beam stop. Since the HyPix-6000 has a dead region in the detector, the results of measuring twice by moving the detector in the vertical direction are combined to obtain two-dimensional data without the dead region. Transmittance correction and empty cell scattering correction are performed on the obtained two-dimensional WAXS pattern. Next, the scattering data is converted to one-dimensional data by performing annular averaging, and Bragg angles θs and θe corresponding to the hem on the small angle side and the wide-angle side of the crystal peak derived from the (110) plane of polypropylene are determined. Then, for the two-dimensional WAXS pattern for which transmittance correction and empty cell scattering correction have been performed, the azimuth angle distribution of the scattering strength in the range of 2θs<2θ<2θe (azimuth angle distribution of the crystal diffraction peak strength derived from the (110) plane) is calculated. An example of the azimuth angle distribution of the scattering strength in the range of 2θs<2θ<2θe obtained is shown in the FIGURE. In the azimuth angle distribution map of the scattering strength in the range of 2θs<2θ<2θe, a (110) peak derived from a c-axis oriented crystal in which the crystal c-axis is oriented in the MD is observed in TD, and a (110) peak derived from an a-axis oriented crystal in which the crystal a-axis is oriented in MD is observed in the vicinity of the MD. The peak derived from the c-axis oriented crystal is approximated by one Gaussian function, the peak derived from the a-axis oriented crystal is approximated by two Gaussian functions, and peak separation is performed. An example is shown in the FIGURE. For peak separation, software IgorPro8 ver. 8.0.0.10 available from WaveMetrics, Inc. is used. When the peak area derived from the c-axis oriented crystal (crystal having a c-axis oriented in the MD) obtained by such peak separation is defined as S_MD, and the peak area (the sum of the areas of the two Gaussian functions) derived from the a-axis oriented crystal (crystal having a c-axis oriented in a direction in the vicinity of the TD) is defined as S_TD, the (110) crystal peak area ratio (MD/TD) is defined by S_MD/S_TD. Note that in the azimuth angle distribution map of scattering strength, the two peaks derived from the c-axis oriented crystal and the two peaks derived from the a-axis oriented crystal are observed as shown in the FIGURE. Thus, the average of the peak areas is defined as S_MD and S_TD.

[Pentad Fraction Measurement]

The polypropylene pentad fraction is calculated by the peak height method from the $^{13}$C-NMR spectrum assigned based on the description in the Polymer Analysis Handbook (edited by the Japan Society for Analytical Chemistry). The $^{13}$C-NMR spectrum is measured using a JEOL-ECZ500 under the conditions where polypropylene pellets are dissolved in o-dichlorobenzene-d, the measurement temperature is 145° C., and the integration number is 25,000.

[Thickness (μm) Measurement]

The thickness (μm) of the separator is measured at room temperature of 23±2° C. using a Digimatic Indicator IDC112 manufactured by Mitutoyo Corporation.

[Air Resistance (s/100 cc)]

The air resistance (s/100 cc) of the separator is measured using a Gurley-type air permeability meter in accordance with JIS P-8117.

[Puncture Strength Evaluation]

A hemispherical needle having a tip having a radius of 0.5 mm is prepared, a separator is interposed between two plates having an opening having a diameter (dia.) of 11 mm, and the needle, separator, and plates are set. A puncture test is performed using "MX2-50N" manufactured by Imada, Co., Ltd., under the conditions of a radius of curvature of the needle tip of 0.5 mm, an opening diameter of the separator holding plates of 11 mm, and a puncture speed of 25 mm/min. The needle and separator are brought into contact and the maximum puncture load (i.e., puncture strength (gf)) is measured.

[Lower Limit Thickness Evaluation]

The polyolefin resin with a 2.5-inch extruder is melted, supplied at a constant discharge rate of 4.0 kg/h using a gear pump, and then discharged from the T-die. Thereafter, the draw speed is gradually increased by 0.3 μm/min every 30 seconds for thin membrane formation. The membrane thickness immediately before the film ruptured is measured as the "lower limit thickness." Furthermore, the lower limit thickness of the three-layer separator is confirmed by laminating the raw material film having the lower limit thickness with a 5 μm PE precursor (raw material film), followed by stretching and pore-forming.

Example 1

[Microporous Membrane Preparation]

A high molecular weight polypropylene resin (PP, MFR (230° C.)=0.51 g/10 min, density=0.91 g/cm$^3$, Mw/Mn=5.2, pentad fraction=99.3%) was melted in a 2.5-inch extruder and supplied to a T-die using a gear pump. The temperature of the T-die was set to 230° C., and the molten polymer was discharged from the T-die, cooled by blown air, and wound on a roller. Similarly, a polyethylene resin (PE, MFR (190° C.)=0.38 g/10 min, density=0.96 g/cm$^3$) was melted in a 2.5-inch extruder and supplied to a T-die using a gear pump. The temperature of the T-die was set to 220° C., the molten polymer was discharged from the T-die, cooled by blown air, and wound on a roller. The PP precursor and the PE precursor (raw material films) wound on the rollers each had a thickness of 5 μm, and next, the PP precursor and the PE precursor were bound so as to form a PP/PE/PP structure to obtain a raw material film having a PP/PE/PP three-layer structure. Next, the three-layer raw material film was annealed at 130° C. for 20 minutes. The annealed raw material film was cold-stretched to 11% at room temperature, then hot-stretched to 158% at 125° C., and relaxed to 113% at 125° C., and micropores were formed, whereby a microporous membrane having a PP/PE/PP three-layer structure was obtained. After the above stretching and pore-forming, the air resistance and puncture strength of the obtained three-layer structure separator were measured, and the MFR and melt tension of the PP layer were measured. The lower limit thickness of the PP precursor was evaluated by increasing the draw speed while maintaining a constant discharge amount after the production of the PP precursor. Furthermore, a three-layer separator was produced by laminating the obtained raw material film having the lower limit thickness with the above 5 μm PE precursor, followed by stretching and pore-forming under the above annealing and stretching conditions (annealing at 130° C. for 20 minutes, cold-stretching to 11% at room temperature, hot-stretching to 158% at 125° C., and relaxing to 113% at 125° C.). Then, the thickness of the separator was confirmed. The results are shown in Table 1.

Examples 2 to 11

Microporous membranes were produced by the same method as Example 1 except that the raw materials were changed as shown in Tables 1 and 2, and the obtained separators were evaluated.

Comparative Examples 1 to 3

Microporous membranes were produced by the same method as Example 1 except that the raw materials were changed as shown in Table 2, and the microporous membranes were evaluated. However, regarding samples in which the lower limit thickness of the PP precursor did not reach 5 μm, the lower limit thickness and the physical characteristics measured at that thickness are shown.

Example 12

A high molecular weight polypropylene resin (PP, MFR (230° C.)=0.25 g/10 min, density=0.91 g/cm$^3$, Mw/Mn=5, pentad fraction=97.5%) and an elastomer (C3 copolymer, MFR (230° C.)=6 g/10 min, melting point=160° C.) having a propylene structure were mixed as a PP:elastomer ratio of 85:15, melted in a 2.5-inch extruder, and supplied to a T-die using a gear pump. The temperature of the T-die was set to 230° C., and the molten polymer was discharged from the T-die, cooled by blown air, and wound on a roller. Similarly, a polyethylene resin (PE, MFR (190° C.)=0.38 g/10 min, density=0.96 g/cm$^3$) was melted in a 2.5-inch extruder and supplied to a T-die using a gear pump. The temperature of the T-die was set to 220° C., the molten polymer was discharged from the T-die, cooled by blown air, and wound on a roller. The PP precursor and the PE precursor (raw material films) wound on the rollers each had a thickness of 5 μm, and next, the PP precursor and the PE precursor were bound so as to form a PP/PE/PP structure to obtain a raw material film having a PP/PE/PP three-layer structure. Next, the three-layer raw material film PP precursor was annealed at 130° C. for 20 minutes. The annealed raw material film was cold-stretched to 11% at room temperature, then hot-stretched to 158% at 125° C., and relaxed to 113% at 125° C., and micropores were formed, whereby a microporous membrane having a PP/PE/PP three-layer structure was obtained. After the above stretching and pore-forming, the air resistance and puncture strength of the obtained three-layer structure microporous membrane separator were measured, and the MFR and melt tension of the PP layer were measured. The lower limit thickness of the PP precursor was evaluated by increasing the draw speed while maintaining a constant discharge amount after the production of the PP precursor. Furthermore, a three-layer separator was produced by laminating the obtained raw material film having the lower limit thickness with the above 5 μm PE precursor, followed by stretching and pore-forming under the above annealing and stretching conditions (annealing at 130° C. for 20 minutes, cold-stretching to 11% at room temperature, hot-stretching to 158% at 125° C., and relaxing to 113% at 125° C.). Then, the thickness of the separator was confirmed. The results are shown in Table 3.

Examples 13 to 21

Microporous membranes were produced by the same method as Example 12 except that the raw materials were changed as shown in Tables 3 and 4, and the obtained separators were evaluated. Note that the C3/C4 random copolymer was a random copolymer having a propylene structure as a primary component and having a 1-butene structure. The C2/C3 random copolymer was a random copolymer having an ethylene structure as a primary component and having a propylene structure. The C4/C3 random copolymer was a random copolymer having a 1-butene structure as a primary component and a propylene structure. The C2/C4 random copolymer was a random copolymer having an ethylene structure as a primary component and having a 1-butene structure. The C2/C8 random copolymer was a random copolymer having an ethylene structure as a primary component and having an octene structure.

Comparative Examples 4 and 5

Microporous membranes were produced by the same method as Example 12 except that the raw materials were changed as shown in Table 4, and the obtained separators were evaluated.

Example 22

A high molecular weight polypropylene resin (PP, MFR (230° C.)=0.51 g/10 min, density=0.91 g/cm$^3$, Mw/Mn=5.2, pentad fraction=99.3%) was melted in a 2.5-inch extruder and supplied to a T-die using a gear pump. The temperature of the T-die was set to 210° C., and the molten polymer was discharged from the T-die, cooled by blown air, and wound on a roller. The PP precursor (raw material film) wound on the roller had a thickness of 11 μm. Next, the PP precursor (raw material film) was annealed at 130° C. for 20 minutes. The annealed raw material film was cold-stretched to 11% at room temperature, then hot-stretched to 158% at 125° C., and relaxed to 113% at 125° C., and micropores were formed, whereby a microporous membrane separator having a PP single-layer structure was obtained. After the above stretching and pore-forming, the air resistance and puncture strength of the obtained PP single-layer structure separator were measured, and the MFR and melt tension of the PP layer were measured. The lower limit thickness of the PP precursor was evaluated by increasing the draw speed while maintaining a constant discharge amount after the production of the PP precursor. Furthermore, a single-layer separator was produced by stretching and pore-forming the obtained raw material film under the above annealing and stretching conditions (annealing at 130° C. for 20 minutes, cold-stretching to 11% at room temperature, hot-stretching to 158% at 125° C., and relaxing to 113% at 125° C.). Then, the thickness of the separator was confirmed. The results are shown in Table 5.

Examples 23 to 29

Microporous membranes were produced by the same method as Example 22, except that the raw materials were changed as shown in Tables 5 and 6, and the obtained separators were evaluated.

Comparative Examples 6 to 8

Microporous membranes were produced by the same method as Example 22, except that the raw materials were changed as shown in Table 6, and the microporous membranes were evaluated. However, regarding samples in which the lower limit thickness of the PP precursor did not reach 11 μm, the physical properties of the measured prepared single-layer structure separators with the lower limit thickness are shown.

TABLE 1

Evaluation of PP/PE/PP Three-Layer Structure Microporous Membrane

| Item | Unit | Example | | | | | | |
| --- | --- | --- | --- | --- | --- | --- | --- | --- |
| | | 1 | 2 | 3 | 4 | 5 | 6 | 7 |
| PP Layer MFR | g/10 min | 0.51 | 0.38 | 0.35 | 0.5 | 0.7 | 0.85 | 0.55 |
| PP Layer Density | g/cm$^3$ | 0.91 | 0.91 | 0.91 | 0.90 | 0.91 | 0.91 | 0.91 |
| Mw of PP | | 900000 | 940000 | 960000 | 920000 | 830000 | 740000 | 910000 |
| Mw/Mn of PP | | 5.2 | 5.3 | 4.9 | 6.7 | 6.2 | 6.4 | 6.9 |

TABLE 1-continued

Evaluation of PP/PE/PP Three-Layer Structure Microporous Membrane

| Item | Unit | Example 1 | 2 | 3 | 4 | 5 | 6 | 7 |
|---|---|---|---|---|---|---|---|---|
| PP Layer Melt Tension | mN | 26 | 29 | 29 | 30 | 25 | 20 | 30 |
| PP Pentad Fraction | % | 99.3 | 97.9 | 96.5 | 95.1 | 99.1 | 98.5 | 97.2 |
| MD/TD Orientation Ratio | | 5.8 | 4.8 | 5.2 | 6.1 | 3.1 | 2.7 | 5.8 |
| Separator Air Resistance | sec/100 ml · 14 μm | 227 | 258 | 278 | 287 | 233 | 245 | 254 |
| Separator Penetration Strength | gf/14 μm | 345 | 343 | 366 | 322 | 317 | 308 | 319 |
| PP Precursor Lower Limit Thickness | μm | 4.1 | 4.4 | 4.6 | 4.9 | 4.2 | 3.8 | 4.9 |
| Three-Layer Separator Lower Limit Thickness | μm | 12.2 | 12.8 | 13.2 | 13.8 | 12.5 | 11.8 | 13.7 |

TABLE 2

Evaluation of PP/PE/PP Three-Layer Structure Microporous Membrane

| Item | Unit | Example 8 | 9 | 10 | 11 | Comparative Example 1 | 2 | 3 |
|---|---|---|---|---|---|---|---|---|
| PP Layer MFR | g/10 min | 0.48 | 0.51 | 0.73 | 0.83 | 0.25 | 0.53 | 0.95 |
| PP Layer Density | g/cm³ | 0.90 | 0.90 | 0.90 | 0.91 | 0.91 | 0.91 | 0.91 |
| Mw of PP | | 920000 | 910000 | 800000 | 740000 | 1100000 | 900000 | 710000 |
| Mw/Mn of PP | | 5.8 | 5.1 | 4.9 | 6 | 5 | 7.7 | 5.5 |
| PP Layer Melt Tension | mN | 28 | 26 | 23 | 17 | 40 | 33 | 14 |
| PP Pentad Fraction | % | 96.1 | 94.3 | 92.3 | 90 | 97.5 | 95.3 | 97 |
| MD/TD Orientation Ratio | | 4.6 | 3.4 | 2.8 | 3.1 | 5.5 | 3.8 | 2.2 |
| Separator Air Resistance | sec/100 ml · 14 μm | 282 | 304 | 323 | 320 | 268 | 281 | 273 |
| Separator Penetration Strength | gf/14 μm | 338 | 354 | 325 | 318 | 370 | 331 | 290 |
| PP Precursor Lower Limit Thickness | μm | 4.6 | 4 | 3.7 | 3.4 | 5.9 | 5.2 | 3.3 |
| Three-Layer Separator Lower Limit Thickness | μm | 13.2 | 12.1 | 11.5 | 11.0 | 15.8 | 14.6 | 11.2 |

TABLE 3

Evaluation of PP/PE/PP Three-Layer Structure Microporous Membrane in which PP Layer Comprises Elastomer

| Item | Unit | Example 12 | 13 | 14 | 15 | 16 | 17 | 18 |
|---|---|---|---|---|---|---|---|---|
| PP Layer MFR | g/10 min | 0.29 | 0.29 | 0.27 | 0.3 | 0.28 | 0.26 | 0.59 |
| PP MFR | g/10 min | 0.25 | 0.25 | 0.25 | 0.25 | 0.25 | 0.25 | 0.53 |
| PP Layer Density | g/cm³ | 0.91 | 0.91 | 0.91 | 0.91 | 0.91 | 0.91 | 0.91 |
| Mw of PP | | 1100000 | 1100000 | 1100000 | 1100000 | 1100000 | 1100000 | 900000 |
| Mw/Mn of PP | | 5 | 5 | 5 | 5 | 5 | 5 | 7.7 |
| PP Pentad Fraction | % | 97.5 | 97.5 | 97.5 | 97.5 | 97.5 | 97.5 | 95.3 |
| Elastomer Type | | C3 Copolymer | C3/C4 Random Copolymer | C2/C3 Random Copolymer | C4/C3 Random Copolymer | C3/C4 Random Copolymer | C3/C4 Random Copolymer | C3/C4 Random Copolymer |
| Elastomer Ratio | % | 15 | 15 | 15 | 15 | 10 | 5 | 10 |
| Elastomer MFR | g/10 min | 6 | 7 | 0.8 | 9 | 7 | 7 | 7 |
| Elastomer Melting Point | ° C. | 160 | 98 | 50 | 100 | 98 | 98 | 98 |
| PP Layer Melt Tension | mN | 25 | 23 | 24 | 23 | 26 | 29 | 24 |
| MD/TD Orientation Ratio | | 3.2 | 3.4 | 2.6 | 2.8 | 3.7 | 4.5 | 3.2 |
| Separator Air Resistance | sec/100 ml · 14 μm | 298 | 292 | 305 | 311 | 280 | 278 | 309 |
| Separator Penetration Strength | gf/14 μm | 328 | 333 | 317 | 302 | 341 | 344 | 305 |

TABLE 3-continued

Evaluation of PP/PE/PP Three-Layer Structure Microporous Membrane in which PP Layer Comprises Elastomer

| | | Example | | | | | | |
|---|---|---|---|---|---|---|---|---|
| Item | Unit | 12 | 13 | 14 | 15 | 16 | 17 | 18 |
| PP Precursor Lower Limit Thickness | μm | 4.5 | 4.3 | 4.4 | 4.4 | 4.6 | 4.9 | 4.5 |
| Three-Layer Separator Lower Limit Thickness | μm | 13.0 | 12.8 | 12.9 | 12.9 | 13.4 | 13.9 | 13.0 |

TABLE 4

Evaluation of PP/PE/PP Three-Layer Structure Microporous Membrane in which PP Layer Comprises Elastomer

| | | Example | | | Comparative Example | |
|---|---|---|---|---|---|---|
| Item | Unit | 19 | 20 | 21 | 4 | 5 |
| PP Layer MFR | g/10 min | 0.25 | 0.6 | 0.58 | 0.26 | 0.93 |
| PP MFR | g/10 min | 0.23 | 0.53 | 0.53 | 0.25 | 0.85 |
| PP Layer Density | g/cm$^3$ | 0.91 | 0.91 | 0.91 | 0.91 | 0.91 |
| Mw of PP | | 1100000 | 900000 | 900000 | 1100000 | 740000 |
| Mw/Mn of PP | | 7.6 | 7.7 | 7.7 | 5 | 6.4 |
| PP Pentad Fraction | % | 95.9 | 95.3 | 95.3 | 97.5 | 98.5 |
| Elastomer Type | | C3/C4 Random Copolymer | C2/C4 Random Copolymer | C2/C8 Block Copolymer | C3 Copolymer | C3/C4 Random Copolymer |
| Elastomer Ratio | % | 10 | 10 | 10 | 5 | 10 |
| Elastomer MFR | g/10 min | 7 | 6.7 | 8 | 6 | 7 |
| Elastomer Melting Point | °C. | 98 | 77 | 122 | 160 | 98 |
| PP Layer Melt Tension | mN | 28 | 22 | 25 | 32 | 15 |
| MD/TD Orientation Ratio | | 2.7 | 3.1 | 3.2 | 4.1 | 2.5 |
| Separator Air Resistance | sec/100 ml · 14 μm | 323 | 318 | 294 | 281 | 283 |
| Separator Penetration Strength | gf/14 μm | 316 | 311 | 323 | 338 | 279 |
| PP Precursor Lower Limit Thickness | μm | 4.7 | 5 | 4.9 | 5.2 | 3.3 |
| Three-Layer Separator Lower Limit Thickness | μm | 13.4 | 14.1 | 13.9 | 14.6 | 11.0 |

TABLE 5

Evaluation of PP Single-Layer Structure Microporous Membrane

| | | Example | | | | | |
|---|---|---|---|---|---|---|---|
| Item | Unit | 22 | 23 | 24 | 25 | 26 | 27 |
| PP Layer MFR | g/10 min | 0.5 | 0.38 | 0.5 | 0.69 | 0.84 | 0.55 |
| PP Layer Density | g/cm$^3$ | 0.91 | 0.91 | 0.90 | 0.91 | 0.91 | 0.91 |
| Mw of PP | | 900000 | 940000 | 920000 | 830000 | 740000 | 910000 |
| Mw/Mn of PP | | 5.2 | 5.3 | 6.7 | 6.2 | 6.4 | 6.9 |
| PP Layer Melt Tension | mN | 26 | 29 | 30 | 25 | 20 | 30 |
| PP Pentad Fraction | % | 99.3 | 97.9 | 95.1 | 99.1 | 98.5 | 97.2 |
| MD/TD Orientation Ratio | | 6.2 | 5.1 | 6.2 | 3.4 | 3.1 | 6.0 |
| Separator Air Resistance | sec/100 ml · 14 μm | 187 | 320 | 241 | 191 | 207 | 219 |
| Separator Penetration Strength | gf/14 μm | 372 | 367 | 344 | 350 | 335 | 346 |
| PP Precursor Lower Limit Thickness | μm | 9.0 | 9.6 | 10.4 | 9.1 | 8.4 | 10.5 |
| Single-Layer Separator Lower Limit Thickness | μm | 8.5 | 9.0 | 9.8 | 8.6 | 7.9 | 9.9 |

TABLE 6

Evaluation of PP Single-Layer Structure Microporous Membrane

| Item | Unit | Example | | Comparative Example | | |
|---|---|---|---|---|---|---|
| | | 28 | 29 | 6 | 7 | 8 |
| PP Layer MFR | g/10 min | 0.5 | 0.82 | 0.25 | 0.52 | 0.93 |
| PP Layer Density | g/cm$^3$ | 0.90 | 0.91 | 0.91 | 0.91 | 0.91 |
| Mw of PP | | 910000 | 740000 | 1100000 | 900000 | 710000 |
| Mw/Mn of PP | | 5.1 | 6 | 5 | 7.7 | 5.5 |
| PP Layer Melt Tension | mN | 26 | 17 | 40 | 33 | 14 |
| PP Pentad Fraction | % | 94.3 | 90 | 97.5 | 95.3 | 97 |
| MD/TD Orientation Ratio | | 3.7 | 3.4 | 5.9 | 4.0 | 2.5 |
| Separator Air Resistance | sec/100 ml · 14 μm | 268 | 285 | 239 | 254 | 239 |
| Separator Penetration Strength | gf/14 μm | 368 | 341 | 384 | 341 | 310 |
| PP Precursor Lower Limit Thickness | μm | 9.0 | 7.9 | 12.0 | 11.7 | 7.8 |
| Single-Layer Separator Lower Limit Thickness | μm | 8.6 | 7.3 | 11.4 | 10.9 | 7.1 |

INDUSTRIAL APPLICABILITY

The separator for a power storage device of present embodiment, in which the separator has high strength and thin membrane formation is possible, can be suitably used as the separator for a power storage device, for example, a lithium-ion secondary battery.

The invention claimed is:

1. A separator for a power storage device, comprising a microporous membrane containing a polyolefin as a primary component, wherein
a melt tension of the microporous membrane measured at a temperature of 230° C. is 30 mN or less, and
a melt flow rate (MFR) of the microporous membrane measured under a load of 2.16 kg at a temperature of 230° C. is 0.9 g/10 min or less.

2. The separator for a power storage device according to claim 1, wherein an area ratio (MD/TD) of (110) crystal peak as measured by wide-angle X-ray scattering of the microporous membrane containing a polyolefin as a primary component is 1.3 or more.

3. The separator for a power storage device according to claim 1, wherein the polyolefin is polypropylene, and the MFR of the polypropylene measured under a load of 2.16 kg at a temperature of 230° C. is 0.3 to 0.9 g/10 min.

4. The separator for a power storage device according to claim 3, wherein a pentad fraction of the polypropylene as measured by 13C-NMR (nuclear magnetic resonance) is 95.0% or more.

5. The separator for a power storage device according to claim 4, wherein the pentad fraction of the polypropylene is 97.0% or more.

6. The separator for a power storage device according to claim 1, wherein the melt tension of the microporous membrane is 20 mN to 30 mN.

7. The separator for a power storage device according to claim 1, wherein a value (Mw/Mn) obtained by diving the weight average molecular weight (Mw) of the polypropylene by the number average molecular weight (Mn) thereof is 7 or less.

8. The separator for a power storage device according to claim 1, wherein the polyolefin is polypropylene, the microporous membrane further comprises an elastomer, and the MFR of the polypropylene measured under a load of 2.16 kg at a temperature of 230° C. is 0.6 g/10 min or less.

9. The separator for a power storage device according to claim 8, wherein the elastomer has a propylene structure as a repeating unit.

10. The separator for a power storage device according to claim 8, wherein the pentad fraction of the polypropylene as measured by 13C-NMR (nuclear magnetic resonance) is 95.0% or more.

11. The separator for a power storage device according to claim 1, wherein the separator for a power storage device has a multilayer structure comprising the microporous membrane and a microporous membrane containing polyethylene as a primary component.

12. The separator for a power storage device according to claim 11, wherein a thickness of the multilayer structure is 18 μm or less, and the separator for a power storage device has an air permeability of 300 s/100 cc·14 μm or less, and a puncture strength of 300 gf/14 μm or more, which are calculated by converting the thickness into 14 μm.

13. A power storage device, comprising a positive electrode, a negative electrode, and the separator for a power storage device according to claim 1 laminated between the positive electrode and the negative electrode.

* * * * *